(12) United States Patent
Jo et al.

(10) Patent No.: US 9,297,371 B2
(45) Date of Patent: *Mar. 29, 2016

(54) HYDRAULIC PRESSURE SUPPLY SYSTEM OF AUTOMATIC TRANSMISSION

(71) Applicant: Hyundai Motor Company, Seoul (KR)

(72) Inventors: Se Hwan Jo, Bucheon-si (KR); Jin Young Hwang, Busan (KR); Taehwan Wi, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 314 days.

This patent is subject to a terminal disclaimer.

(21) Appl. No.: 13/712,590

(22) Filed: Dec. 12, 2012

(65) Prior Publication Data

US 2014/0064990 A1    Mar. 6, 2014

(30) Foreign Application Priority Data

Sep. 3, 2012   (KR) .......................... 10-2012-0097304

(51) Int. Cl.
*F04B 23/04*    (2006.01)
*F04B 49/00*    (2006.01)
*F16H 61/00*    (2006.01)

(52) U.S. Cl.
CPC ............... *F04B 23/04* (2013.01); *F04B 49/002* (2013.01); *F16H 61/0031* (2013.01); *F16H 2061/0037* (2013.01)

(58) Field of Classification Search
CPC ..... F01M 1/02; F01M 1/16; F01M 2001/123; Y02T 10/76; F16H 57/0401; F16H 2047/025; F16H 204/045; F16H 57/0441; F04B 23/04; F04B 49/002

USPC .............. 417/278, 302, 307, 308, 364, 410.1, 417/440, 505; 123/1 A, 196 R, 196 S, 196 V, 123/196 W, 197.1, 198 P; 137/565.3, 137/565.33, 565.35
See application file for complete search history.

(56) References Cited

U.S. PATENT DOCUMENTS 5,785,628 A * 7/1998 Kamada et al. ................ 477/130
5,875,865 A * 3/1999 Wakahara et al. ............. 180/248
(Continued)

FOREIGN PATENT DOCUMENTS

| JP | 2005-172112 A | 6/2005 |
| JP | 2005-180561 A | 7/2005 |
| JP | 2011-127718 A | 6/2011 |

*Primary Examiner* — Justin Jonaitis
*Assistant Examiner* — Stephen Mick
(74) *Attorney, Agent, or Firm* — Morgan, Lewis & Bockius LLP (57) ABSTRACT

A hydraulic pressure supply system may generate low hydraulic pressure and high hydraulic pressure using oil stored in an oil pan and may supply the low hydraulic pressure and the high hydraulic pressure respectively to a low pressure portion and a high pressure portion in which the hydraulic pressure supply system may include: a low-pressure hydraulic pump; a first switch valve; a low-pressure regulator valve controlling the hydraulic pressure supplied from the first switch valve and supplying the hydraulic pressure to the low pressure portion; a high-pressure hydraulic pump discharging the raised hydraulic pressure to a high-pressure line; a second switch valve disposed between the first low-pressure line and the high-pressure line, a high-pressure regulator valve controlling the hydraulic pressure supplied from the high-pressure hydraulic pump and supplying the stable high hydraulic pressure to the high pressure portion; a bypass line bypassing the first switch valve.

15 Claims, 3 Drawing Sheets

(56) References Cited

U.S. PATENT DOCUMENTS

| | | |
|---|---|---|
| 6,338,695 B1 * | 1/2002 | Aoki et al. .................... 477/160 |
| 6,941,922 B2 * | 9/2005 | Williams et al. .......... 123/196 R |
| 7,331,323 B2 * | 2/2008 | Hara ......................... 123/196 A |
| 2006/0065217 A1 * | 3/2006 | Ikegawa ..................... 123/41.42 |
| 2009/0082153 A1 * | 3/2009 | Fujikawa et al. ............. 475/128 |
| 2010/0071362 A1 * | 3/2010 | Alaze et al. ..................... 60/581 |
| 2011/0239803 A1 * | 10/2011 | Shimizu et al. ............ 74/473.11 |

* cited by examiner

HYDRAULIC PRESSURE SUPPLY SYSTEM OF AUTOMATIC TRANSMISSION

CROSS-REFERENCE TO RELATED APPLICATION

The present application claims priority to Korean Patent Application No. 10-2012-0097304 filed on Sep. 3, 2012, the entire contents of which is incorporated herein for all purposes by this reference.

BACKGROUND OF THE INVENTION

1. Field of the Invention

The present invention relates to a hydraulic pressure supply system of an automatic transmission for a vehicle. More particularly, the present invention relates to a hydraulic pressure supply system of an automatic transmission for a vehicle which can improve safety and reliability as a consequence that the automatic transmission can be operated normally using hydraulic pressure of a low-pressure hydraulic pump when a high-pressure hydraulic pump is stopped.

2. Description of Related Art

Recently, vehicle makers direct all their strength to improving fuel economy due to worldwide high oil prices and strengthening of exhaust gas regulations.

Improvement of fuel economy may be achieved by improving power delivery efficiency in an automatic transmission, and improvement of the power delivery efficiency may be achieved by minimizing unnecessary power consumption of a hydraulic pump.

A recent automatic transmission is provided with a low-pressure hydraulic pump and a high-pressure hydraulic pump so as to improve fuel economy. Therefore, hydraulic pressure generated by the low-pressure hydraulic pump is supplied to a low pressure portion (i.e., a torque converter, a cooling device, and a lubrication device), and hydraulic pressure generated by the high-pressure hydraulic pump is supplied to a high pressure portion (i.e., friction members selectively operated when shifting).

In further detail, general hydraulic pressure of the automatic transmission is generated for the low pressure portion (i.e., generated by the low-pressure hydraulic pump), and hydraulic pressure demanded by the high pressure portion is generated by the high-pressure hydraulic pump and then is supplied to the high pressure portion.

Since power consumption for driving the hydraulic pumps can be minimized, fuel economy may be enhanced. In addition, since a load applied to the hydraulic pumps is reduced, noise and vibration may be reduced and durability may be improved.

Since hydraulic pressure generated by the low-pressure hydraulic pump is supplied to the high-pressure hydraulic pump and the high hydraulic pressure is generated by the high-pressure hydraulic pump according to a conventional hydraulic pressure supply system, the hydraulic pressure supplied to the high pressure portion is insufficient and vehicle cannot drive if the high-pressure hydraulic pump is out of order.

In addition, since the low-pressure hydraulic pump is always driven, durability of the low-pressure hydraulic pump may be deteriorated. In addition, if the low-pressure hydraulic pump is out of order or is stopped, the hydraulic pressure supply system cannot operate. Therefore, stability and reliability may be low.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic pressure supply system of an automatic transmission for a vehicle having advantages of improving safety and reliability when a low-pressure hydraulic pump or a high-pressure hydraulic pump is out of order or is stopped as a consequence of operating the hydraulic pressure supply system using any one of the low-pressure hydraulic pump or the high-pressure hydraulic pump.

In addition, various aspects of the present invention are directed to providing a hydraulic pressure supply system of an automatic transmission for a vehicle having advantages of operating the hydraulic pressure supply system using any one of the low-pressure hydraulic pump or the high-pressure hydraulic pump considering durability of the pumps.

Further, various aspects of the present invention are directed to providing a hydraulic pressure supply system of an automatic transmission for a vehicle having advantages of improving responsiveness of a high pressure portion when initial starting or shifting by preferentially supplying hydraulic pressure to the high pressure portion through blocking control of a switch valve.

A hydraulic pressure supply system of an automatic transmission for a vehicle according to one or more exemplary embodiments of the present invention may generate low hydraulic pressure and high hydraulic pressure using oil stored in an oil pan and may supply the low hydraulic pressure and the high hydraulic pressure respectively to a low pressure portion and a high pressure portion.

The hydraulic pressure supply system may include a low-pressure hydraulic pump receiving oil stored in the oil pan through a first input line, generating hydraulic pressure, and discharging the hydraulic pressure to a first low-pressure line, a first switch valve selectively opening or closing a hydraulic line of the hydraulic pressure supplied from the first low-pressure line, a low-pressure regulator valve controlling the hydraulic pressure supplied from the first switch valve through a second low-pressure line to be a stable hydraulic pressure and supplying the hydraulic pressure to the low pressure portion through a third low-pressure line, a high-pressure hydraulic pump raising the hydraulic pressure supplied from the low-pressure hydraulic pump through the first low-pressure line and discharging the raised hydraulic pressure to a high-pressure line, a second switch valve disposed between the first low-pressure line and the high-pressure line and selectively opening or closing a hydraulic line, a high-pressure regulator valve controlling the hydraulic pressure supplied from the high-pressure hydraulic pump through the high-pressure line or the hydraulic pressure of the low-pressure hydraulic pump selectively supplied through the second switch valve to be stable high hydraulic pressure and supplying the stable high hydraulic pressure to the high pressure portion, a bypass line bypassing the first switch valve and connecting the first low-pressure line with the second low-pressure line, and a second input line connecting the oil pan with the first low-pressure line so as for the oil to flow in only one direction from the oil pan to the first low-pressure line.

In one or more exemplary embodiments of the present invention, the low-pressure hydraulic pump may be a mechanical hydraulic pump driven by an engine, and the high-pressure hydraulic pump may be an electric hydraulic pump driven by an electric motor.

In one or more exemplary embodiments of the present invention, each of the low-pressure hydraulic pump and the high-pressure hydraulic pump may be an electric hydraulic pump driven by an electric motor.

At least one of the first switch valve and the second switch valve may be controlled by control pressure of a first solenoid valve that is duty-controllable.

The first solenoid valve may not supply the control pressure or may supply first control pressure or second control pressure to at least one of the first switch valve and the second switch valve.

The first switch valve and the second switch valve may be not operated when the first solenoid valve does not supply the control pressure.

Both of the first switch valve and the second switch valve may be operated when the first solenoid valve supplies the first control pressure.

The first switch valve may be not operated and the second switch valve is operated when the first solenoid valve supplies the second control pressure.

The first solenoid valve may receive control supply pressure from a reducing valve connected to the high-pressure line.

The low-pressure regulator valve may be connected to the second low-pressure line and may supply a portion of the hydraulic pressure supplied from the second low-pressure line to a first supply line so as to control the hydraulic pressure of the second low-pressure line to be stable and supply the hydraulic pressure to the third low-pressure line.

The first supply line may be connected to the first input line.

The low-pressure regulator valve may be controlled by control pressure of a second solenoid valve, elastic force of an elastic member, and the hydraulic pressure counteracting the control pressure of the second solenoid valve and supplied from the third low-pressure line.

The second solenoid valve may be a proportional control solenoid valve.

The high-pressure regulator valve may be selectively connected to the first low-pressure line through the second switch valve and may be directly connected to the high-pressure line so as to supply a portion of the hydraulic pressure supplied from the first low-pressure line and the high-pressure line to a second supply line and control the hydraulic pressure to be stable.

The second supply line may be connected to the second low-pressure line.

The high-pressure regulator valve may be controlled by control pressure of a third solenoid valve, elastic force of an elastic member, and the hydraulic pressure counteracting the control pressure of the third solenoid valve and supplied from the high-pressure line.

The third solenoid valve may be a proportional control solenoid valve.

An orifice may be mounted on the bypass line.

A check valve for preventing back flow may be mounted on the second input line.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

Figure 1:
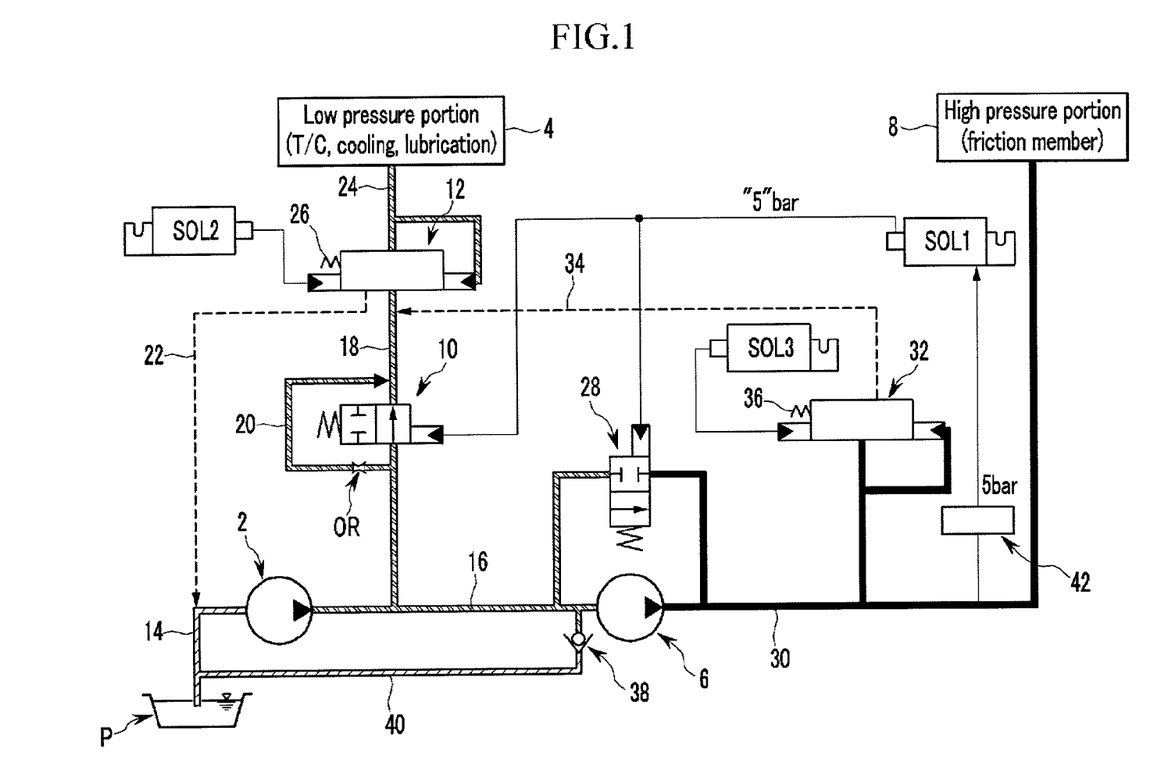
FIG. 1 is a schematic diagram of a hydraulic pressure supply system according to an exemplary embodiment of the present invention when a low-pressure hydraulic pump and a high-pressure hydraulic pump are operated normally.

FIG. 1 is a schematic diagram of a hydraulic pressure supply system according to an exemplary embodiment of the present invention when a low-pressure hydraulic pump and a high-pressure hydraulic pump are operated normally.

Referring to FIG. 1, a hydraulic pressure supply system according to an exemplary embodiment of the present invention is adapted to supply low hydraulic pressure generated by a low-pressure hydraulic pump 2 to a low pressure portion 4 such as a torque converter (T/C), a cooling portion, a lubrication portion and to supply high hydraulic pressure generated by a high-pressure hydraulic pump 6 to a high pressure portion 8 for operating friction members related to shifting.

The low hydraulic pressure is a lower pressure facilitating operation of the torque converter (T/C) and cooling and lubrication, and the high hydraulic pressure is a high pressure facilitating operation of a plurality of friction members.

The low hydraulic pressure is generated by the low-pressure hydraulic pump 2 and is supplied to the low pressure portion 4 through a first switch valve 10 and a low-pressure regulator valve 12.

The low-pressure hydraulic pump 2, as is well known to a person of an ordinary skill in the art, is a mechanical pump driven by torque of an engine or is an electric pump driven by an electric motor.

The low-pressure hydraulic pump 2 is connected to an oil pan P through a first input line 14, and the low hydraulic pressure generated by the low-pressure hydraulic pump 2 is discharged to a first low-pressure line 16.

The first switch valve 10 is a spool valve, and selectively supplies or not the hydraulic pressure of the first low-pressure line 16 to the low-pressure regulator valve 12 by receiving first control pressure or second control pressure from first solenoid valve SOL1 which is duty-controllable or not receiving any control pressure from the first solenoid valve SOL1.

That is, if the first switch valve 10 receives the first control pressure from the first solenoid valve SOL1, the first switch valve 10 supplies the hydraulic pressure of the first low-pressure line 16 to the low-pressure regulator valve 12 through a second low-pressure line 18. If the first switch valve 10 does not receive any control pressure (i.e., control pressure is "0" bar) or receives the second control pressure from the first solenoid valve SOL1, the first switch valve 10 disconnects the first low-pressure line 16 from the second low-pressure line 18.

Herein, the first control pressure is higher than the second control pressure. For convenience of explanation, it is exemplified but is not limited to that the first control pressure is "5" bar and the second control pressure is "2" bar.

In addition, the first low-pressure line 16 forming a downstream of the first switch valve 10 and the second low-pressure line 18 forming an upstream of the first switch valve 10 are connected by a bypass line 20, and an orifice OR is mounted on the bypass line 20. Therefore, though the first switch valve 10 disconnects the first low-pressure line 16 from the second low-pressure line 18, minimum hydraulic pressure is supplied from the first low-pressure line 16 to the second low-pressure line 18.

The low-pressure regulator valve 12 is connected to the switch valve 10 through the second low-pressure line 18 and is connected to the first input line 14 through a first supply line 22. Therefore, the low-pressure regulator valve 12 supplies a portion of the hydraulic pressure supplied from the first switch valve 10 to the first input line 14 through the first supply line 22 and adjusts the hydraulic pressure. The hydraulic pressure adjusted by the low-pressure regulator valve 12 is supplied to the low pressure portion 4 through a third low-pressure line 24.

For this purpose, the low-pressure regulator valve 12 may be a spool valve. In addition, the low-pressure regulator valve 12 is controlled by control pressure of a second solenoid valve SOL2 performing proportional control, elastic force of an elastic member 26, and the hydraulic pressure of the third low-pressure line 24 counteracting the control pressure of the second solenoid valve SOL2. The elastic force of the elastic member 26 is set according to the hydraulic pressure demanded by the third low-pressure line 24.

In addition, a second switch valve 28 connected to the first low-pressure line 16 selectively supplies the hydraulic pressure of the first low-pressure line 16 to the high pressure portion 8.

For this purpose, the second switch valve 28 may be a spool valve, and selectively supplies or not the hydraulic pressure of the first low-pressure line 16 to the high pressure portion 8 by receiving the first control pressure ("5" bar) or the second control pressure ("2" bar) from the first solenoid valve SOL1 which is duty-controllable or not receiving any control pressure from the first solenoid valve SOD.

That is, if the second switch valve 28 does not receive the control pressure from the first solenoid valve SOL1, the second switch valve 28 connects the first low-pressure line 16 with a high-pressure line 30 connected to the high pressure portion 8. If the second switch valve 28 receives from the first control pressure ("5" bar) or the second control pressure ("2" bar) from the first solenoid valve SOL1, the second switch valve 28 disconnects the first low-pressure line 16 from the high-pressure line 30.

In addition, the high-pressure hydraulic pump 6 may be an electric pump driven by an electric motor. The high-pressure hydraulic pump 6 raises the low hydraulic pressure supplied through the first low-pressure line 16 to high hydraulic pressure and discharges the high hydraulic pressure to the high-pressure line 30.

In addition, the hydraulic pressure discharged from the high-pressure hydraulic pump 6 to the high-pressure line 30 is controlled to stable high hydraulic pressure by a high-pressure regulator valve 32 and the stable high hydraulic pressure is supplied to the high pressure portion 8.

The high-pressure regulator valve 32 is connected to the high-pressure line 30 and is connected to the second low-pressure line 18 through a second supply line 34. Therefore, the high-pressure regulator valve 32 supplies a portion of the hydraulic pressure supplied through the high-pressure line 30 to the low pressure portion 4 through the second supply line 34 and adjusts the hydraulic pressure.

The high-pressure regulator valve 32 may be a spool valve. In addition, the high-pressure regulator valve 32 is controlled by control pressure of a third solenoid valve SOL3 performing proportional control, elastic force of an elastic member 36, and the hydraulic pressure of the high-pressure line 30 counteracting the control pressure of the third solenoid valve SOL3. The elastic force of the elastic member 36 is set according to the hydraulic pressure demanded by the high-pressure line 30.

The second supply line 34 is connected to the second low-pressure line 18 so as to supply the hydraulic pressure to the low pressure portion 4 when only the high-pressure hydraulic pump 6 is operated.

In addition, the high-pressure hydraulic pump 6 is connected to the oil pan P through a second input line 40. A check valve 38 for preventing back flow is disposed on the second input line 40. Therefore, the high-pressure hydraulic pump 6 receives the oil from the oil pan P directly, generates the high hydraulic pressure, and supplies the high hydraulic pressure to the high pressure portion 8 when the hydraulic pressure is not supplied or insufficient hydraulic pressure is supplied from the low-pressure hydraulic pump 2.

It is exemplified but is not limited to in the exemplary embodiment that the low-pressure hydraulic pump 2 is a mechanical hydraulic pump and the high-pressure hydraulic pump 6 is an electric hydraulic pump. Both the two hydraulic pumps 2 and 6 may be the electric hydraulic pumps.

In addition, the first solenoid valve SOL1 receives a control supply pressure from a reducing valve 42 connected to the high-pressure line 30, and the reducing valve 42 supplies the control supply pressure of "5" bar that is the same as the first control pressure to the first solenoid valve SOL1.

When the low-pressure hydraulic pump 2 and the high-pressure hydraulic pump 6 are operated normally, the hydraulic pressure supply system according to an exemplary embodiment of the present invention supplies the low hydraulic pressure generated by the low-pressure hydraulic pump 2 to the low pressure portion 4 and supplies the high hydraulic pressure generated by the high-pressure hydraulic pump 6 to the high pressure portion 8, as shown in FIG. 1.

At this time, the first solenoid valve SOL1 is controlled to supply the first control pressure ("5" bar), and the low hydraulic pressure generated by the low-pressure hydraulic pump 2 is supplied to the low-pressure regulator valve 12 through the first switch valve 10 and is controlled to be stable low hydraulic pressure. After that, the stable low hydraulic pressure is supplied to the low pressure portion 4.

In addition, the portion of the low hydraulic pressure generated by the low-pressure hydraulic pump 2 is raised to the high hydraulic pressure by the high-pressure hydraulic pump 6, and the high hydraulic pressure is controlled to be the stable high hydraulic pressure by the high-pressure regulator valve 32. After that, the stable high hydraulic pressure is supplied to the high pressure portion 8.

At this time, the second switch valve 28 disconnects the first low-pressure line 16 from the high-pressure line 30 by the first control pressure ("5" bar) supplied from the first solenoid valve SOL1.

Figure 2:
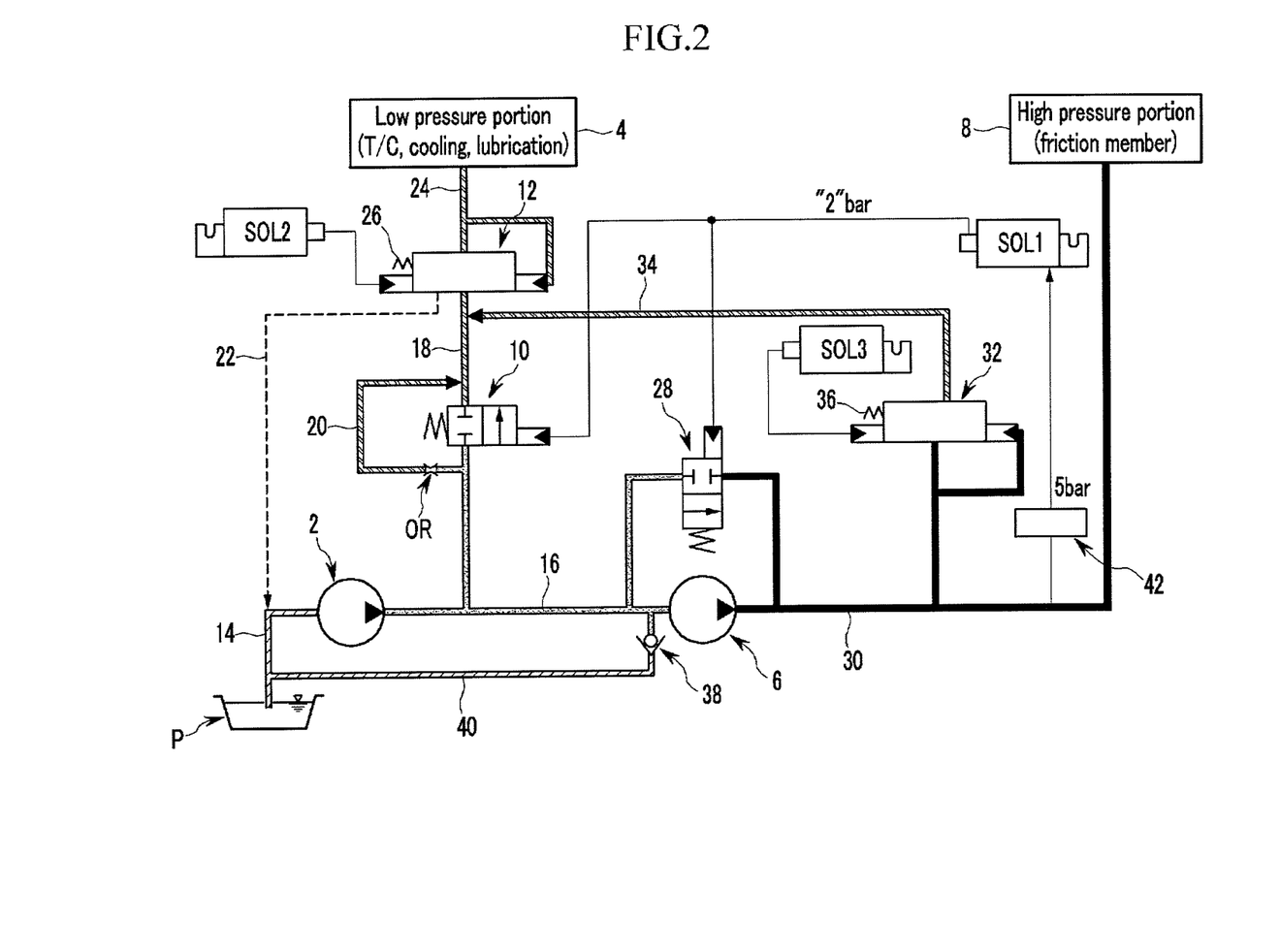
FIG. 2 is a schematic diagram of a hydraulic pressure supply system according to an exemplary embodiment of the present invention when only a high-pressure hydraulic pump is operated.

FIG. 2 is a schematic diagram of a hydraulic pressure supply system according to an exemplary embodiment of the present invention when only a high-pressure hydraulic pump is operated.

That is, FIG. 2 illustrates oil flow when the low-pressure hydraulic pump 2 is out of order or is stopped considering durability, or the hydraulic pressure is supplied only to the high pressure portion 8 due to operation of an idle stop & go (ISG) system. At this time, the first solenoid valve SOL1 is controlled to supply the second control pressure ("2" bar).

In this case, the first switch valve 10 disconnects the first low-pressure line 16 from the second low-pressure line 18 by the second control pressure supplied from the first solenoid valve SOL1, and the second switch valve 28 disconnects the first low-pressure line 16 from the high-pressure line 30 by the second control pressure supplied from the first solenoid valve SOL1.

In this case, the high-pressure hydraulic pump 6 is operated so as to pump the oil of the oil pan P through the second input line 40 and generates the high hydraulic pressure. Therefore, preparatory hydraulic pressure can be supplied to the high pressure portion 8.

At this time, the high-pressure regulator valve 32 generates the preparatory hydraulic pressure demanded by the high pressure portion 8 through the high-pressure line 30, and supplies a portion of the hydraulic pressure to the low pressure portion 4 through the second supply line 34.

Particularly, when the vehicle provided with the ISG system is stopped temporarily, the high hydraulic pressure may be supplied to the high pressure portion 8 in a state of engine stop. At this time, the high-pressure hydraulic pump 6 is operated so as to pump the oil in the oil pan P through the second input line 40 and generate the high hydraulic pressure. Therefore, the preparatory hydraulic pressure can be supplied to the high pressure portion 8.

That is, although the engine is stopped and the low-pressure hydraulic pump 2 is not operated, the high hydraulic pressure can be supplied to the high pressure portion 8 by operation of the high-pressure hydraulic pump 6.

Figure 3:
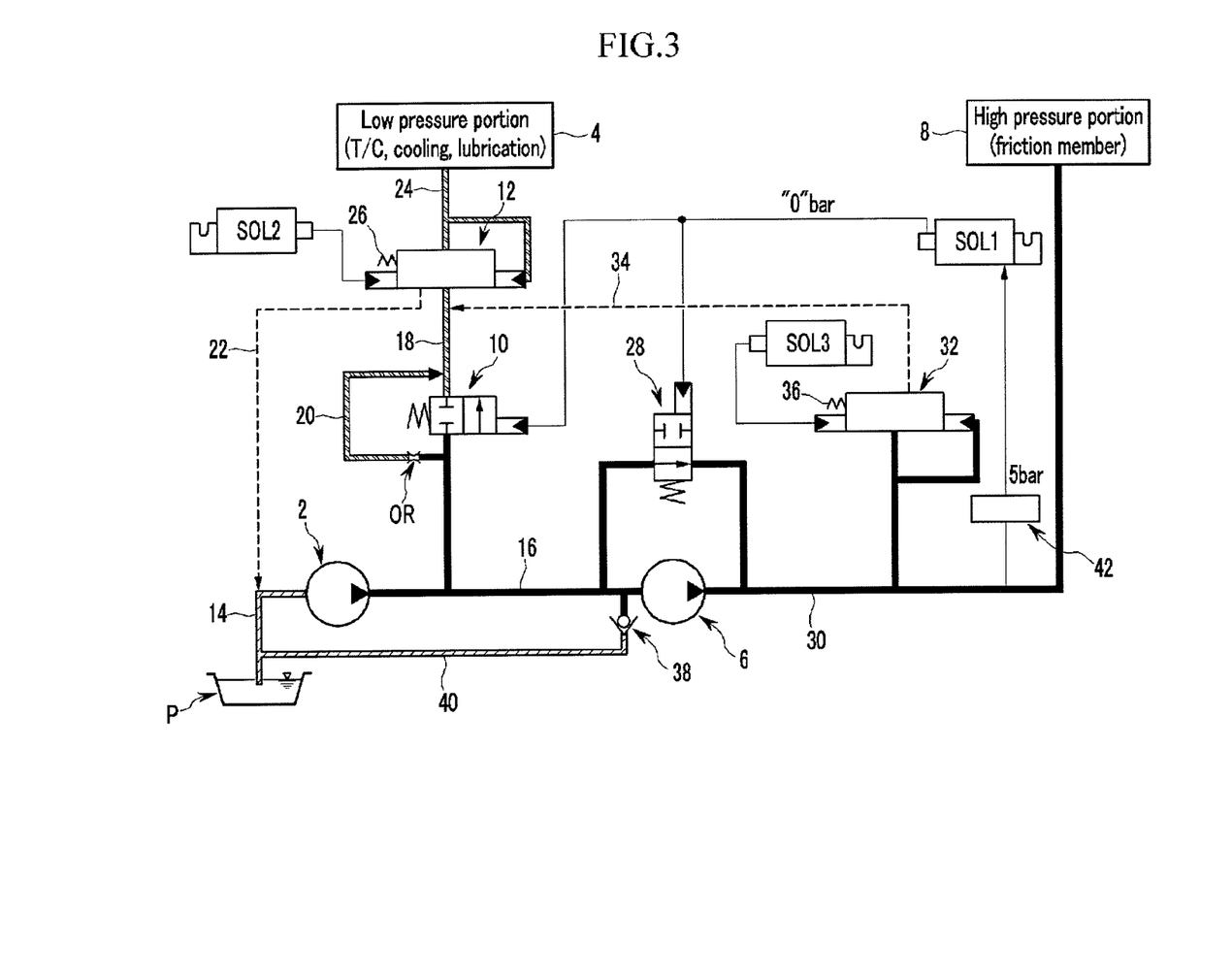
FIG. 3 is a schematic diagram of a hydraulic pressure supply system according to an exemplary embodiment of the present invention when only a low-pressure hydraulic pump is operated.

FIG. 3 is a schematic diagram of a hydraulic pressure supply system according to an exemplary embodiment of the present invention when only a low-pressure hydraulic pump is operated.

That is, FIG. 3 illustrates oil flow when the high-pressure hydraulic pump 6 is out of order or is stopped considering durability, or the preparatory hydraulic pressure is supplied to the high pressure portion 8 due to operation of the ISG system during the high-pressure hydraulic pump 6 is stopped. At this time, the first solenoid valve SOL1 is switched off so as not to generate any control pressure (i.e., control pressure is "0" bar).

At this time, the low-pressure hydraulic pump 2 increases discharging amount so as to generate the high hydraulic pressure, the hydraulic pressure is not supplied to the low-pressure regulator valve 12 by the first switch valve 10, and the high hydraulic pressure generated by the low-pressure hydraulic pump 2 is supplied to the high-pressure line 30 by the second switch valve 28.

At this time, although the first switch valve 10 disconnects the first low-pressure line 16 from the second low-pressure line 18, the minimum hydraulic pressure is supplied to the second low-pressure line 18 by the orifice OR mounted on the bypass line 20.

In addition, the hydraulic pressure supplied to the high-pressure line 30 is controlled to the high hydraulic pressure by the high-pressure regulator valve 32 and the high hydraulic pressure is supplied to the high pressure portion 8. Therefore, the high pressure portion 8 can be operated smoothly.

At this time, the hydraulic pressure supplied from the high-pressure regulator valve 32 to the second low-pressure line 18 through the second supply line 34 achieves smooth operation of the low pressure portion 4.

Since the hydraulic pressure supply system is operated normally using the low-pressure hydraulic pump 2 when the high-pressure hydraulic pump 6 is not operated, safety and reliability of the hydraulic pressure supply system having two hydraulic pumps 2 and 6 may be improved.

If the first solenoid valve SOL1 is switched off (i.e., control pressure is "0" bar) and the low-pressure hydraulic pump 2 and the high-pressure hydraulic pump 6 are simultaneously driven when initial starting of the vehicle, the hydraulic pressure can be preferentially supplied to the high pressure portion 8. Therefore, responsiveness to the starting may be improved.

According to an exemplary embodiment of the present invention, the low-pressure hydraulic pump 2 generates the low hydraulic pressure and the high-pressure hydraulic pump 6 generates the high hydraulic pressure by increasing the hydraulic pressure supplied from the low-pressure hydraulic pump 2. Therefore, power loss of the hydraulic pumps may be minimized, durability may be improved, and noise and vibration of the hydraulic pumps may be reduced.

In addition, the hydraulic pressure supply system can be operated normally when any one of the low-pressure hydraulic pump 2 and the high-pressure hydraulic pump 6 is out of order. Therefore, durability of the hydraulic pumps and stability and reliability may be enhanced.

In addition, since both of the low-pressure hydraulic pump 2 and the high-pressure hydraulic pump 6 can generated the high hydraulic pressure independently, operation reliability of the vehicle having the ISG system may be improved.

In addition, since only the low-pressure hydraulic pump or the high-pressure hydraulic pump can operate the hydraulic pressure supply system, safety and reliability of the system may be improved.

Since the hydraulic pressure is preferentially supplied to the high pressure portion through blocking control of the switch valves, responsiveness of the high pressure portion may be improved when initial starting or shifting.

Since both of the low-pressure hydraulic pump 2 and the high-pressure hydraulic pump 6 can generated the high hydraulic pressure independently, the system may be applied to the vehicle having the ISG system.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pressure supply system of an automatic transmission for a vehicle which generates low hydraulic pressure and high hydraulic pressure using oil stored in an oil pan and supplies the low hydraulic pressure and the high hydraulic pressure respectively to a low pressure portion and a high pressure portion, the hydraulic pressure supply system comprising:
   a low-pressure hydraulic pump receiving the oil stored in the oil pan through a first input line, generating hydraulic pressure, and discharging the hydraulic pressure to a first low-pressure line;
   a first switch valve selectively opening or closing a hydraulic line connected to the first low-pressure line;
   a low-pressure regulator valve controlling hydraulic pressure supplied from the first switch valve through a second low-pressure line connected to the first switch valve to be a stable hydraulic pressure and supplying the stable hydraulic pressure to the low pressure portion through a third low-pressure line connected to the low pressure portion;
   a high-pressure hydraulic pump raising the hydraulic pressure supplied from the low-pressure hydraulic pump through the first low-pressure line and discharging a raised hydraulic pressure to a high-pressure line connected to the high-pressure hydraulic pump and the high pressure portion;
   a second switch valve disposed between the first low-pressure line and the high-pressure line and selectively opening or closing a hydraulic line branched from the first low-pressure line and connected to the high-pressure line;
   a high-pressure regulator valve controlling the raised hydraulic pressure supplied from the high-pressure hydraulic pump through the high-pressure line or the hydraulic pressure of the low-pressure hydraulic pump selectively supplied through the second switch valve to be a stable high hydraulic pressure and supplying the stable high hydraulic pressure to the high pressure portion;
   a bypass line bypassing the first switch valve and connecting the first low-pressure line with the second low-pressure line; and
   a second input line connecting the oil pan with the first low-pressure line between the low-pressure hydraulic pump and the high-pressure hydraulic pump so as for the oil to flow in only one direction from the oil pan to the first low-pressure line,
   wherein the high-pressure regulator valve is selectively fluidically connected to the first low-pressure line through the second switch valve and is directly fluidically connected to the high-pressure line so as to supply a portion of the hydraulic pressure from the first low-pressure line and the high-pressure line to a second supply line, thereby controlling stability of the hydraulic pressure, and
   wherein the second supply line is connected to the second low-pressure line.

2. The hydraulic pressure supply system of claim 1, wherein the low-pressure hydraulic pump is a mechanical hydraulic pump driven by an engine, and the high-pressure hydraulic pump is an electric hydraulic pump driven by an electric motor.

3. The hydraulic pressure supply system of claim 1, wherein each of the low-pressure hydraulic pump and the high-pressure hydraulic pump is an electric hydraulic pump driven by an electric motor.

4. The hydraulic pressure supply system of claim 1, wherein at least one of the first switch valve and the second switch valve is selectively controlled by control pressure of a first solenoid valve that is duty-controllable.

5. The hydraulic pressure supply system of claim 4, wherein the first solenoid valve does not supply the control pressure or supplies a first control pressure or a second control pressure to the at least one of the first switch valve and the second switch valve.

6. The hydraulic pressure control system of claim 5, wherein the first switch valve and the second switch valve are not operated when the first solenoid valve does not supply the control pressure,
   both of the first switch valve and the second switch valve are operated when the first solenoid valve supplies the first control pressure, and
   the first switch valve is not operated and the second switch valve is operated when the first solenoid valve supplies the second control pressure.

7. The hydraulic pressure supply system of claim 4, wherein the first solenoid valve receives control supply pressure from a reducing valve connected to the high-pressure line and the first solenoid valve.

8. The hydraulic pressure supply system of claim 1, wherein the low-pressure regulator valve is connected to the second low-pressure line and supplies a portion of the hydraulic pressure supplied from the second low-pressure line to a first supply line so as to control the hydraulic pressure of the second low-pressure line to be stable and supply the hydraulic pressure to the third low-pressure line.

9. The hydraulic pressure supply system of claim 8, wherein the first supply line is connected to the first input line communicating with the oil pan.

10. The hydraulic pressure supply system of claim 1, wherein the low-pressure regulator valve is controlled by control pressure of a second solenoid valve, elastic force of an elastic member, and the hydraulic pressure counteracting the control pressure of the second solenoid valve and supplied from the third low-pressure line.

11. The hydraulic pressure supply system of claim 10, wherein the second solenoid valve is a proportional control solenoid valve.

12. The hydraulic pressure supply system of claim 1, wherein the high-pressure regulator valve is controlled by control pressure of a third solenoid valve, elastic force of an elastic member, and the hydraulic pressure counteracting the control pressure of the third solenoid valve and supplied from the high-pressure line.

13. The hydraulic pressure supply system of claim 12, wherein the third solenoid valve is a proportional control solenoid valve.

14. The hydraulic pressure supply system of claim 1, wherein an orifice is mounted on the bypass line.

15. The hydraulic pressure supply system of claim 1, wherein a check valve for preventing back flow is mounted on the second input line.

\* \* \* \* \*